May 15, 1951 — K. TITZE — 2,552,695
GOVERNING OF INTERNAL-COMBUSTION ENGINES
Filed Feb. 14, 1949
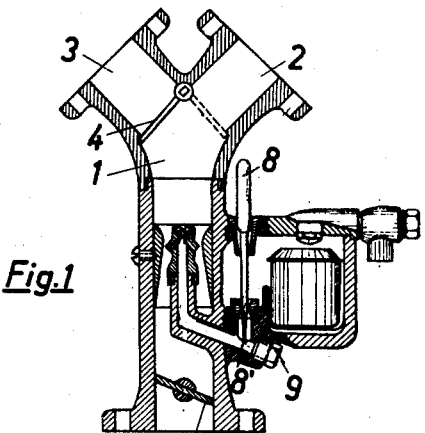
Fig. 1
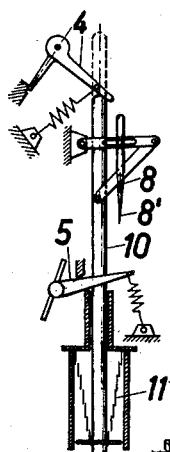
Fig. 2
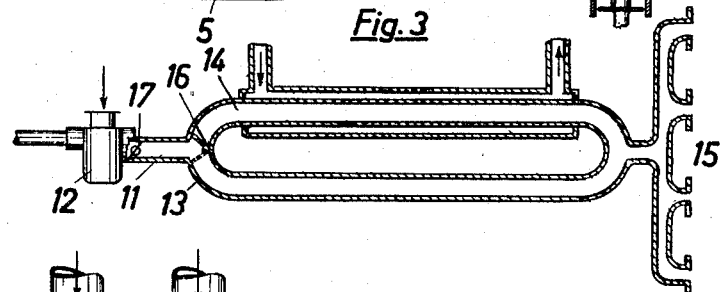
Fig. 3
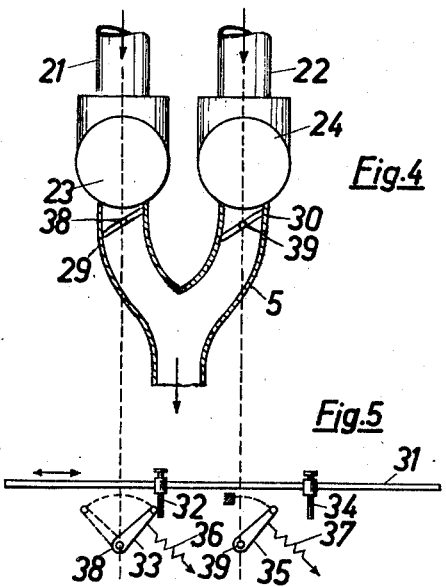
Fig. 4
Fig. 5
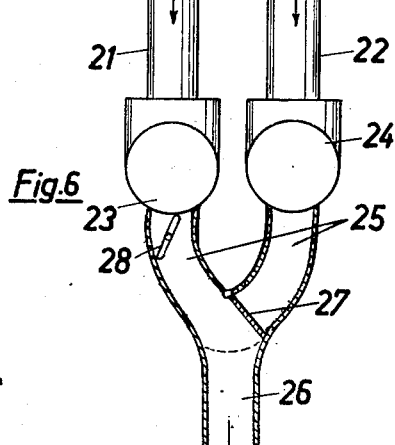
Fig. 6
Inventor
Karl Titze
By [signature]
Atty.

Patented May 15, 1951

2,552,695

UNITED STATES PATENT OFFICE 2,552,695

GOVERNING OF INTERNAL-COMBUSTION ENGINES

Karl Titze, Vienna, Austria

Application February 14, 1949, Serial No. 76,321
In Austria May 5, 1948

8 Claims. (Cl. 123—97)

This invention relates to a method of governing internal combustion engines in accordance with the load.

Briefly the method of the invention consists in that over a part of the power range the engine output is governed by throttling while over the remainder of the range it is governed by adjusting the temperature of the induction air.

Under low load the induction air is heated to a high temperature in order to obtain complete vaporization of the fuel and complete mixture formation, and also to obtain the largest possible specific volume of air. During the time that hot induction air is being supplied to the carburettor or engine the output of the latter is controlled in the usual manner by throttling. At higher load the throttling device opens the full cross-section of the induction pipe and this condition is maintained with further increase of the load while the heating of the induction air is progressively lessened as by mixing heated induction air and relatively cool air. This heat governing thus succeeds throttle governing and is within its own range independent of the latter. This partial load range is determined by the difference in temperature between the heated induction air and the surrounding air and can be altered at will by corresponding adjustment of the temperature of the heated induction air. The separation of both modes of governing enables full utilization of the range of most economical hot air induction. On the other hand, if required for the operation of the engine, the two methods of governing can be made to overlap to any extent desired.

The method of hot-air governing incorporates the adjustment of the induction air temperature to the instantaneous engine load and thus affords the simplest means of simultaneously governing the load and controlling the required induction air temperature which, contrary to throttle governing, works without losses.

The quantity of fuel corresponding to the instantaneous induction temperature and engine loading is supplied through a fuel control of usual type which is in this case of particular importance since, owing to the high induction temperature at low load, the viscosity of the fuel and consequently the rate of flow through the fuel jet are appreciably modified.

In order to obtain at low loads the required hot and weak mixture and at full load the corresponding cool and rich mixture, the hot-air governing arrangement is suitably complemented, in the manner already adopted with throttle-governing, by a subsidiary and restricted device for mixture control and ignition timing adjustment or equivalent.

The method of the invention can be applied in different ways and with various arrangements, but examples of suitable arrangements are illustrated on the accompany drawing.

Fig. 1 shows in section a carburettor with superimposed induction manifold and air mixing valve, and with fuel control by needle valve.

Fig. 2 shows diagrammatically the operative coupling of the fuel and engine controls.

Fig. 3 shows in section a second form of construction of a device for hot-mixture governing.

Fig. 4 is a diagrammatic view of a third embodiment employing two carburettors.

Fig. 5 shows diagrammatically the operating gear for the embodiment of Fig. 4.

Fig. 6 shows in section a modification of the arrangement with two carburettors.

The carburettor of Fig. 1 incorporates a throttle valve 5, a superimposed induction manifold 1 with a branch 2 for hot-air induction and a branch 3 for cool-air induction, as well as a mixing valve 4 controlling the hot-air induction. Fuel governing is effected by the needle valve 8 working in the main jet opening 9 for the fuel. During hot-air induction via the branch 2 the cylindrical or slightly-tapered stem of the needle valve frees a cross-sectional area of the jet nozzle appropriate to the instantaneous partial load. Adjusting itself to the increasingly cooler induction air within the range of hot-air governing, the more considerably tapered portion of the needle stem 8' is increasingly withdrawn from the jet and at full load with relatively cooler air induction frees the maximum cross-sectional area of the jet nozzle.

It is also possible to use a carburettor without a needle in which case the latter is replaced by an adjustable device regulating the fuel-air mixture by the introduction of secondary air.

The fuel and engine-governing elements are constituted by throttle levers, such as illustrated in Fig. 2, connected in such a manner that they can be controlled by tension or pressure from a remote position. The throttle valve 5 is opened by the governor rod 10 through the intermediary of the spring 11. After full opening of the throttle valve 5 the governor rod 10 continues to move, compressing the spring 11 and causing the mixing valve 4 to be reset to cool-air instead of hot-air induction. The motion of the governor rod 10 is transmitted in a suitable ratio to the needle valve or jet needle 8. The governor rod thus operates the air mixing valve 4, the throttle valve 5 and the jet needle or needle valve 8, in full accordance with requirements. All these elements are adjustable for regulating their combined operation. The transition from throttle governing to hot air governing is preferably communicated to the person operating the governor gear in some suitable way in order that such person may be aware of the range in which the engine is working.

In the example shown in Fig. 3 an arrangement is provided in which the load-governing is effected by varying the temperature of the fuel-air mixture. The induction pipe 11 leading to the engine divides directly behind the carburettor into two pipes 13, 14 which in the example are of equal length and unite again immediately in front of the engine 15. The pipe 13 is continually surrounded by the exhaust gases and thus maintained at a high temperature. The pipe 14 remains cool or only slightly heated. At the separation point of the pipes 13 and 14 is arranged a mixing valve 16, which under partial load opens the hot pipe 13 and under full load the cool pipe 14, while in the intermediate positions it permits the mixing of the two currents. The mixing valve 16 is coupled to the throttle valve 17 in such manner that consequent on the complete opening of the throttle valve the mixture is increasingly directed by the simultaneously operated mixing valve into the cooler pipe instead of into the heated pipe alone. The combined operation of the throttle valve and mixing valve is effected by a system of rods such as shown in Fig. 2.

In accordance with Figs. 4 and 5 the engine is provided with two carburettors 23, 24 arranged either separately or in combination, the induction pipes 21, 22 of which leading to the engine join together.

With increasing engine load a movement of the governor rod 31 (Fig. 5) to the left transmitted through the adjustable stop 32 and the adjustable lever 33 on the throttle spindle 38 opens the throttle valve 29 of the hot-induction carburettor 23. When this throttle valve is fully open, or earlier if desired, the adjustable stop 34 acting through the adjustable lever 35 opens the throttle valve 30 turning on the spindle 39 of the cold-induction carburettor 24. When the throttle valve 30 has opened, the throttle valve 29 of the hot-induction carburettor 23 closes after passing beyond the neutral position. The latter carburettor is wholly or partly closed when the throttle valve 30 opens the cold-induction carburettor 24 completely. By moving and adjusting the stops 32 and 34, together with the levers 33 and 35, the two carburettors can be made to work in conjunction in any desired manner. The return springs 36, 37 bring the two throttle valves 29 and 30 back into their original positions. Starting and no-load running regulation is incorporated in the hot-induction carburettor 23. Different fuels can be used in the two carburettors.

In the arrangement according to Fig. 6, the throttle valve of the cold-induction carburettor is replaced by a mixing throttle 27 at the junction of the two induction pipes. This mixing throttle and the throttle valve 28 are operated in succession by rod elements in accordance with Fig. 2.

The hot-air governing system described above using considerably preheated induction air at low engine loading exhibits a number of advantageous features. Hot-air governing operates over a larger part of the loading range with automatic temperature adjustment and without loss. The high temperatures of the heated induction air produce lower throttling and induction losses owing to the resultant greater specific volume, higher induction pressure with consequent reduction in the quantity of undesirable residual exhaust gases, the possibility of a greater air excess and consequent complete utilization of the fuel, as well as a uniform mixture distribution to all cylinders of the engine. The result of such elimination of losses is an economy in fuel consumption of such degree that by the combustion of lesser quantities of fuel in the presence of larger quantities of air the combustion temperature is reduced to a degree nearly sufficient to counterbalance the increased temperature of the induction air. Thus, in spite of the use of such higher induction temperatures the combustion and engine temperatures are not increased; consequently, losses due to higher specific heat, greater heat transmission or dissociation, or by knocking (detonation) in the engine, do not occur. The acceleration of the engine is improved by hot-air induction since no precipitation of fuel takes place after opening the throttle. The engine also warms up more rapidly.

With the frequently changing loads characteristic of automobile engines, the correct induction air temperature is assured for every instantaneous load since both the cold and the hot air flow are instantly available when required. Engines already having medium preheating of either the mixture or the induction air will obtain an increase in maximum power owing to the possibility of cold-air operation at full load.

The system of governing in accordance with the present invention reduced losses in governing to a minimum and in fact offers for the first time a simple, practical and appropriate method of utilizing the known advantages of heated induction air when running under partial load.

I claim:

1. A method of load governing for internal-combustion engines in which the induction air is preheated by the exhaust gases characterised in that with increasing load throttle governing is first exclusively applied while over the remaining range of load variation governing is effected by varying the temperature of the induction air.

2. A method in accordance with claim 1, characterised in that during the period of exclusive throttle governing the fuel-air mixture is conducted through a heated induction pipe while over the remainder of the load range the mixture is progressively deflected by a mixing valve to a cooled induction pipe.

3. A method in accordance with claim 1, characterised in that the induction of heated and of normal air respectively is effected through two separately-acting carburettors the mixing pipes of which are united, and in that over the whole load range or a part thereof the throttling element of the one carburettor remains continuously open while the throttling element of the other carburettor remains continuously closed, the commencement or termination respectively of such opening or closing being effected at different controllable times.

4. A method in accordance with claim 3, characterised in that an ordinary carburettor throttling element is caused to open over a portion of the load range by the action of an appropriate mechanical control operating continuously either with increasing or decreasing load and remains wholly or partly closed over the other portion of the load range.

5. A method in accordance with claim 3, characterised in that only one of the carburettors is controlled by a throttling element of usual type while the other carburettor is controlled by a throttling element which is situated at the junction point of the two mixing pipes and closes the one carburettor in the measure that the other carburettor is opened.

6. A device for carrying out the method of claim 3, characterised in that the carburettor throttle valve is of a form suitable for closing the carburettor in either one or the other of its end positions.

7. A device for carrying out the method of claim 1, characterised in that the carburettor is provided with two connecting pipes preferably in the form of a manifold through one of which pipes heated air and the other cool air is drawn in, an air mixing valve closing either the heated air entry or the cool air entry at will or assuming an intermediate position enabling a more or less heated air mixture to be produced.

8. A device in accordance with claim 7, characterised in that a needle valve entering the main fuel jet opening is jointly actuated with the throttle valve and the air mixing valve and all three elements are operated from a single point.

KARL TITZE.

No references cited.